(12) United States Patent
Joncheray et al.

(10) Patent No.: US 9,284,428 B2
(45) Date of Patent: Mar. 15, 2016

(54) CRYSTALLINE FOAM

(75) Inventors: Thomas Julien Joncheray, Wavre (BE); Jan Marc Vandenbroeck, Zichem (BE)

(73) Assignee: Huntsman International LLC, The Woodlands, TX (US)

( * ) Notice: Subject to any disclaimer, the term of this patent is extended or adjusted under 35 U.S.C. 154(b) by 939 days.

(21) Appl. No.: 13/381,996

(22) PCT Filed: Jun. 15, 2010

(86) PCT No.: PCT/EP2010/058379
§ 371 (c)(1),
(2), (4) Date: Jan. 3, 2012

(87) PCT Pub. No.: WO2011/003699
PCT Pub. Date: Jan. 13, 2011

(65) Prior Publication Data
US 2012/0101178 A1   Apr. 26, 2012

(30) Foreign Application Priority Data
Jul. 10, 2009  (EP) .................................... 09165186

(51) Int. Cl.
*C08J 9/12* (2006.01)
*C08J 9/30* (2006.01)

(52) U.S. Cl.
CPC .. *C08J 9/122* (2013.01); *C08J 9/30* (2013.01); *C08J 2203/06* (2013.01); *C08J 2375/00* (2013.01)

(58) Field of Classification Search
CPC .... C08J 2203/06; C08J 2375/00; C08J 9/122; C08J 9/30
See application file for complete search history.

(56) References Cited

U.S. PATENT DOCUMENTS

| | | | |
|---|---|---|---|
| 4,973,608 A | 11/1990 | Krippl et al. | |
| 5,006,501 A | 4/1991 | Tamano et al. | |
| 5,296,517 A | 3/1994 | Wetzig et al. | |
| 5,985,190 A * | 11/1999 | Harfmann | 264/53 |
| 6,562,880 B1 | 5/2003 | Doerge et al. | |
| 6,716,890 B1 | 4/2004 | Niederoest et al. | |
| 2002/0052425 A1* | 5/2002 | Kaku et al. | 521/137 |
| 2003/0036578 A1* | 2/2003 | Arlt et al. | 521/155 |
| 2004/0162359 A1* | 8/2004 | Barber et al. | 521/159 |
| 2006/0084777 A1 | 4/2006 | Bleys et al. | |
| 2009/0131546 A1* | 5/2009 | Vazquez | 521/137 |

FOREIGN PATENT DOCUMENTS

| | | |
|---|---|---|
| GB | 947 410 | 1/1964 |
| GB | 2 244 714 | 12/1991 |
| JP | 6 228 358 | 8/1994 |
| RU | 2 010 813 | 4/1994 |
| SU | 366728 | 1/1979 |

OTHER PUBLICATIONS

International Search Report and Written Opinion regarding corresponding application No. PCT/EP2010/058379, dated Mar. 4, 2011.
G. Woods, The ICI Polyurethanes Book, 1990, $2^{nd}$ edition, p. 32-35.
Van Der Net et al., "The Crystal Structure of Bubbles in the Wet Foam Limit" *Soft Matter*, 2006, 2, p. 129-134.
Chung et al., "Fabricating Scaffolds by Microfluidics" *Biomicrofluidics*, 2009, 3 (2), p. 22403-1-22403-8.
Boltenhagen, P. et al., "Structural transitions in crystalline foams" *Europhys. Lett.*, 1998, 41 (5) , p. 571-576.
Van Der Net et al., "Highly structured porous solids from liquid foam templates" *Colloids and Surfaces A : Physicochem. Eng. Aspects*, 346 (2009),p. 5-10.
Van Der Net et al., "Crystalline arrangements of microbubbles in monodisperse foams" *Colloids and Surfaces A : Physicochem. Eng. Aspects*, 309 (2007),p. 117-124.

* cited by examiner

*Primary Examiner* — John Cooney
(74) *Attorney, Agent, or Firm* — Robert A. Diaz

(57) ABSTRACT

Crystalline foam and process for making it by first creating a crystalline arrangement of gas bubbles in curable composition and allowing this composition to cure subsequently.

2 Claims, No Drawings

CRYSTALLINE FOAM

This application is the National Phase of International Application PCT/EP2010/058379 filed Jun. 15, 2010 which designated the U.S. and which claims priority to Foreign Application No. 09165186.9 filed Jul. 10, 2009. The noted applications are incorporated herein by reference.

The present invention relates to a novel foam and more in particular to a novel crystalline foam.

Crystalline foams are known in nature. Examples are natural soaps which are aqueous systems wherein the bubbles organise themselves into a regular structure. Such foams are not very stable; they disappear after a while.

Structural transitions in crystalline foams from soap solutions have been described by P. Boltenhagen et al. in 1998 Europhys. Lett. 41, 571-576.

Chung et al. disclose in 21 Apr. 2009 Biomicrofluidics 3(2): 22403 that monodisperse bubbles self-assemble into crystalline structures. They make solid foams from the liquid crystalline foams from aqueous alginate solutions.

Formation and deposition of monodisperse microbubbles in order to make foams, comprising crystalline arrangements of these microbubbles, has been disclosed in Colloids and Surfaces A: Physicochem. Eng. Aspects 309 (2007) 117-124 by van der Net et al. See also A. van der Net et al. in Soft Matter, 2006, 2, 129-134.

Recently a process to make solid foams from liquid foam templates was disclosed by A. van der Net et al. at a conference at the European Space and Technology Centre, Keplerlaan 1, 2201 A Z Noordwijk, The Netherlands from Jul. 8-10, 2008 (later published in Colloids and Surfaces A: Physicochemical and Engineering Aspects 346 (2009) 5-10). First a liquid foam with accurately defined structural properties was generated from an aqueous monomer solution. Then this solution was subsequently polymerised and cross-linked using appropriate initiation mechanisms. An open-celled hydrogel is formed.

GB 2244714 discloses a process for making a foamed polyurethane by dispersing an inert gas with mechanical stirring into a polyurethane forming composition comprising a polyisocyanate, polyols and a dehydrating agent and curing this composition containing therein the inert gas substantially homogeneously distributed. Dispersing of inert gas may be conducted by mechanical frothing.

JP 6228358 discloses a method for making polyurethane foam which comprises blowing air from fine holes of 0.1-1.0 mm in a liquid mixture of polyols and isocyanate and stirring at high speed.

Processes like these, proposed in GB 2244714 and JP 06228358, provide polyurethane foams. Such foams are not crystalline however. The cells are polydisperse and do not form a regular crystalline structure.

We have found a completely novel foam and a process for making such a foam. In the process no use needs to be made of aqueous solutions.

Surprisingly it was found that crystalline arrangements may be formed in non-aqueous liquids (at ambient conditions) comprising a polyisocyanate although the viscosity of such liquids may be different from water and from aqueous solutions and although the surface tension of bubbles formed in such polyisocyanate containing liquids could be different from those formed in aqueous solutions.

Further it was surprisingly found that once a crystalline arrangement has been formed in such polyisocyanate containing liquid, a crystalline foam may be formed by bulk polymerization with an increasing temperature (the reaction of the polyisocyanate is exothermic). It is to be noted in this respect that the reaction in the prior art disclosing the preparation of crystalline foams by reaction is rather solution polymerization.

The foams obtained show a great ordering of cells which may contain one or more chosen gases. In the process the deposition and positioning of the cells has been disconnected from the cross-linking/curing process. Such foams may be used in thermal insulation applications, such as housing and refrigeration, in buoyancy applications, construction, packaging, shoe soles, furniture, materials having acoustic absorption and transmission properties, in coatings and as elastomers.

The present invention is related to a crystalline foam comprising a plurality of one or more of the groups selected from urethane, isocyanurate and oxazolidone groups.

Crystalline arrangement or foam in the context of the present invention is defined as an arrangement or foam wherein at least 50% of the bubbles or cells, as the case may be, have been packed in a close packing way. Preferably at least 75% of the bubbles or cells are packed this way and most preferably at least 90%. The terms "arrangement" and "bubbles" refer to the situation before the cross-linking/curing process while the terms "foam" and "cells" refer to the situation after the cross-linking/curing process.

The arrangement or foam has a layered cell-structure which may be a monolayer cell-structure, a bilayer cell-structure or a multilayer cell-structure (which has 3 or more layers of bubbles or cells). When the arrangement or foam has a multilayer structure the close packing preferably is cubic or hexagonal.

Further the present invention relates to a process for preparing a crystalline foam comprising a plurality of one or more of the groups selected from urethane, isocyanurate and oxazolidone groups by first creating a crystalline arrangement of gas bubbles in a liquid, curable composition which is able to form a plurality of one or more of the above groups and subsequently allowing the curable composition to form a plurality of one or more of these groups.

In the context of the present invention the following terms have the following meaning:
1) isocyanate index or NCO index or index:
   the ratio of NCO-groups over isocyanate-reactive hydrogen atoms+epoxy groups present in a formulation, given as a percentage:

$$\frac{[NCO] \times 100}{[\text{active hydrogen atoms} + \text{epoxy groups}]} (\%).$$

In other words the NCO-index expresses the percentage of isocyanate actually used in a formulation with respect to the amount of isocyanate theoretically required for reacting with the amount of isocyanate-reactive hydrogen+epoxy used in a formulation.
   It should be observed that the isocyanate index as used herein is considered from the point of view of the actual polymerisation process preparing the material involving the isocyanate ingredient and the isocyanate-reactive and epoxy ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen and one primary amine group is considered to comprise one reactive hydrogen.
3) Reaction system: a combination of components wherein the polyisocyanates are kept in one or more containers separate from the isocyanate-reactive components.
4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
5) The word "average" refers to "number average" unless indicated otherwise.
6) Liquid curable composition: a curable composition having an initial viscosity of 1-40,000 mPa·s at 25° C.
7) Pot-life of the curable composition: is the time which it takes for the viscosity of the curable composition to reach 50,000 mPa·s at 25° C. and ambient pressure after the curable composition has been prepared.
8) The diameter of a bubble or cell is the average internal diameter measured by means of microscopy. Depending on the size optical or electronic microscopy is used.

In the process according to the present invention first a curable composition is made which composition is able to form a plurality of one or more of the groups selected from urethane, isocyanurate and oxazolidone groups (hereinafter called "curable composition"). Making a curable composition is done by combining and mixing a polyisocyanate and a polyol and/or a trimerization catalyst and/or an epoxy resin.

This combining and mixing may be conducted in known manner. The ingredients may be combined in any order. If two or three of the ingredients selected from polyols, trimerization catalysts and epoxy resins are used, they are preferably first combined and mixed and then combined with the polyisocyanate and mixed. The temperature and pressure at which this combining and mixing is conducted and for how long this is conducted may vary in known manner and is determined by considerations regarding efficiency and pot-life of the curable composition.

Those skilled in the art are able easily to select appropriate conditions for a particular curable composition; certainly in view of the examples.

The initial viscosity of the curable composition ranges of from 1 to 40,000 mPa·s and most preferably of from 5 to 10,000 mPa·s, both at 25° C.

After the curable composition has been made, gas bubbles are deposited into the curable composition. The depositing of the gas bubbles into the curable composition may be conducted by using droplet generating devices, like flow focusing devices, in particular microfluidic ones. This technique has been described by van der Net supra. Instead of using an aqueous surfactant solution in the bubble delivery device of van der Net, a curable composition is used. Another way of depositing the gas bubbles is by using a pump which delivers gas bubbles of narrowly defined volume via a hose with an orifice under the surface of the curable composition until the curable composition is completely filled with bubbles. Such gas bubble delivery devices are commercially available; an example is a PG Dosing Unit from Thwing-Albert in West Berlin, N.J. 08091, USA with a fixed or variable bubble size setting. In order to make the deposition of the gas bubbles more efficient a plurality of orifices may be used. When a number of orifices are positioned in a row, the bubbles may be deposited layer by layer. In as far as the bubbles are not yet in crystalline arrangement immediately after they have been deposited, the bubbles are subsequently allowed to settle and order themselves in such crystalline arrangement.

The temperature and pressure at which this depositing and settling of the gas bubbles is conducted and the time which is used to conduct this process also may be varied in known manner and also is determined by considerations regarding efficiency and pot-life of the curable composition.

The diameter of the gas bubbles (and the cells of the foam later) may vary between wide ranges, e.g. from 0.1 μm-1 cm and preferably from 1 μm-5 mm. The size is determined by the settings of the device used, the size of the orifice and the type of gas, amongst others.

The gas bubbles (and the cells of the foam later) preferably are monodisperse, which in the context of the present invention means that at least 80% of the bubbles has a certain diameter ±20%, or bidisperse, which means that two populations of bubbles exist which populations each have a certain diameter ±20% and together form at least 80% of the bubbles and wherein the bubble size of the two populations is such that it allows for close packing of both populations together. Most preferred are monodisperse bubbles.

The gas used to make the bubbles may be selected from any of the known (inert) blowing agents used in making polyurethane foams. The selected compound or mixture of compounds should be a gas under the conditions of use, i.e. under the conditions of the deposition of the gas bubbles. The gas may be selected from air, $N_2$, $CO_2$, methylformate, methylal, acetone, hydrocarbons, dialkyl ethers, alkyl alkanoates, aliphatic and cycloaliphatic hydrofluorocarbons, hydrochlorofluorocarbons, chlorofluorocarbons, fluorine-containing ethers and perfluorocarbons. Suitable hydrocarbon blowing agents include lower aliphatic or cyclic hydrocarbons of such as pentane, iso-pentane, cyclopentane or neopentane, hexane, cyclohexane and mixtures thereof.

Perfluorocarbons which may be used as blowing agents include perfluoroalkanes and perfluorocycloalkanes, for example perfluorobutane, perfluoropentane or perfluorocyclopentane. Hydrofluorocarbons which may be used as blowing agents include hydrofluoroalkanes and hydrofluorocycloalkanes, for example the symmetrical and unsymmetrical difluoroethanes, trifluoroethanes and tetrafluoroethanes and pentafluoroethane.

Hydrochlorofluorocarbons which may be used as blowing agents include hydrochlorofluoroalkanes and hydrochlorofluorocycloalkanes, for example chlorodifluoromethane, 1,1-dichloro-2,2,2 trifluoroethane, 1,1-dichloro-1-fluoroethane, 1-chloro-1,1-difluoroethane, 1-chloro-1-fluoroethane, 1-chloro-2-fluroethane, 1-chloro-1,1,2-trifluoroethane, 1-chloro-1,2,2-trifluoroethane, 1,1-dichloro-2,2-difluoroethane and 1,1,2-trichloro-2,2-difluoroethane.

Fluorine-containing ethers which may be used as blowing agents include $CF_3OCF_3$, $CF_2HOCF_2H$, $CF_2HCHFOCF_2H$, $CHF_2CF_2OCHFCHF_2$, heptafluoro-1,4-dioxan and 2,2,3,3-tetrafluoro-oxacyclobutane.

Suitable dialkyl ether to be used as blowing agents include compounds having from 2 to 6 C atoms. As examples of suitable ethers, there may be mentioned $CH_3OCH_3$, $CH_3CH_2OCH_3$, $CH_3CH_2OCH_2CH_3$, $CH_3CH_2CH_2\text{-}0\text{-}CH_3$.

Examples of preferred blowing agents include isobutane, n-pentane, isopentane, cyclopentane or mixtures thereof; 1,1- dichloro-2-fluoroethane (HCFC 14 lb); 1,1-trifluoro-2-fluoroethane (HFC 134a); chlorodifluoro-methane (HCFC 22); 1,1,1,2,3,3,3-heptafluoropropane (HFC 227ea); 1,1-difluoro-3,3,3-trifluoropropane (HFC 245fa); 1,1,1,3,3-pentafluorobutane (HFC 365mfc.); 1,1,1,3,3-pentafluoropropane (HCFC 245fa), and combinations thereof.

The curable composition should not contain chemical or physical, reactive or inert blowing agents (except the gas bubbles after they have been deposited).

Examples of curable compositions are compositions comprising a polyisocyanate and one or more of a trimerization catalyst, a polyol and an epoxy compound:

1) a polyisocyanate and a trimerization catalyst, which upon curing give materials comprising a plurality of isocyanurate groups;
2) a polyisocyanate and a polyol which upon curing give materials comprising a plurality of urethane groups;
3) a polyisocyanate, a polyol and a trimerization catalyst which upon curing give a material comprising a plurality of isocyanurate and urethane groups;
4) a polyisocyanate and an epoxy resin which upon curing give materials comprising a plurality of oxazolidone groups;
5) a polyisocyanate, a trimerization catalyst and an epoxy resin which upon curing give a material comprising a plurality of oxazolidone and isocyanurate groups.

The polyisocyanate, the polyol and the epoxy resin used in the curable compositions should be liquids at the operating temperature under ambient pressure when making the curable composition and when creating a crystalline arrangement of gas bubbles. The trimerization catalyst which often is a solid may be dissolved in any of these liquids.

The polyisocyanate used for making the curable composition and the foam according to the present invention may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and, in particular, diphenylmethane diisocyanate (MDI) and polyisocyanate compositions comprising diphenylmethane diisocyanate (like so-called polymeric MDI, crude MDI, uretonimine modified MDI and prepolymers having free isocyanate groups made from MDI and polyisocyanates comprising MDI) and mixtures of such polyisocyanates. MDI and polyisocyanate compositions comprising MDI are most preferred and especially those selected from 1) a diphenylmethane diisocyanate comprising at least 35%, preferably at least 60% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1) and/or 2), the variant having an NCO value of 20% by weight or more and being the reaction product of an excess of polyisocyanate 1) and/or 2) and of a polyol having an average nominal hydroxyl functionality of 2-8 and preferably 2-4 and an average molecular weight of at most 1000; 4) a diphenylmethane diisocyanate comprising a homologue comprising 3 or more isocyanate groups; 5) prepolymers having an NCO value of 5-30% by weight and being the reaction product of any one or more of polyisocyanates 1)-4) and of a polyol having an average nominal hydroxyl functionality of 2-8 and preferably 2-4 and an average molecular weight of more than 1000 and up to 8000; and 6) mixtures of any of the aforementioned polyisocyanates.

Polyisocyanate 1) comprises at least 35% by weight of 4,4'-MDI. Such polyisocyanates are known in the art and include pure 4,4'-MDI and isomeric mixtures of 4,4'-MDI, 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec$^R$ MPR and 1306 ex Huntsman (Suprasec is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec$^R$ 2020, ex Huntsman Urethane modified variants of the above polyisocyanate 1) are also known in the art, see e.g. The ICI Polyurethanes Book by G. Woods 1990, $2^{nd}$ edition, pages 32-35.

Polyisocyanate 4) is also widely known and commercially available. These polyisocyanates are often called crude MDI or polymeric MDI. Examples are Suprasec$^R$ 2185, Suprasec$^R$ 5025 and Suprasec$^R$ DNR ex Huntsman.

The prepolymers (polyisocyanate 5)) are also widely known and commercially available. Examples are Suprasec$^R$ 2054 and Suprasec$^R$ 2061, both ex Huntsman.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec$^R$ 2021 ex Huntsman.

In principle, all epoxy resins which are customary in epoxy resin technology can be used in preparing a curable composition according to the present invention. It is also possible to use a mixture of epoxy resins.

Examples of epoxy resins are:

I) Polyglycidyl and poly(β-methylglycidyl)esters, obtainable by reacting a compound having at least two carboxyl groups in the molecule and, respectively, epichlorohydrin and β-methylepichlorohydrin. The reaction is expediently effected in the presence of bases.

Aliphatic polycarboxylic acids can be used as the compound having at least two carboxyl groups in the molecule. Examples of such polycarboxylic acids are oxalic acid, succinic acid, glutaric acid, adipic acid, pimelic acid, suberic acid, azelaic acid and dimerized or trimerized linoleic acid.

However, cycloaliphatic polycarboxylic acids, such as, for example, tetrahydrophthalic acid, 4-methyltetrahydrophthalic acid, hexahydrophthalic acid or 4-methylhexahydrophthalic acid, may also be used.

Furthermore, aromatic polycarboxylic acids, such as, for example, phthalic acid, isophthalic acid or terephthalic acid, may be used.

II) Polyglycidyl or poly(β-methylglycidyl)ethers, obtainable by reacting a compound having at least two free alcoholic hydroxyl groups and/or phenolic hydroxyl groups with epichlorohydrin or β-methylepichlorohydrin under alkaline conditions or in the presence of an acidic catalyst with subsequent treatment with alkali.

The glycidyl ethers of this type are derived, for example, from acyclic alcohols, for example from ethylene glycol, diethylene glycol or higher poly(oxyethylene)glycols, propane-1,2-diol or poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol or sorbitol, and from polyepichlorohydrins. Further glycidyl ethers of this type are derived from cycloaliphatic alcohols, such as 1,4- cyclohexanedimethanol, bis(4-hydroxycyclohexyl)methane or 2,2-bis(4-hydroxycyclohexyl)propane, or from alcohols which contain aromatic groups and/or further functional groups, such as N,N-bis(2-hydroxyethyl)aniline or p,p'-bis(2-hydroxyethylamino)-diphenylmethane.

The glycidyl ethers may also be based on mononuclear phenols, such as, for example, p-tert-butylphenol, resorcinol or hydroquinone, or on polynuclear phenols, such as, for example, bis(4-hydroxyphenyl)methane, 4,4'-dihydroxybiphenyl, bis(4-hydroxyphenyl)sulphone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Further suitable hydroxy compounds for the preparation of glycidyl ethers are novolaks, obtainable by condensation of aldehydes, such as formaldehyde, acetaldehyde, chloral or furfuraldehyde, with phenols or bisphenols which are unsubstituted or substituted by chlorine atoms or $C_1$-$C_9$-alkyl groups, such as, for example, phenol, 4-chlorophenol, 2-methylphenol or 4-tert-butylphenol.

III) Poly(N-glycidyl) compounds, obtainable by dehydrochlorination of the reaction products of epichlorohydrin with amines which contain at least two amine hydrogen atoms. These amines are, for example, aniline, n-butylamine, bis(4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, which are derived from dithiols, such as, for example, ethane-1,2-dithiol or bis(4-mercaptomethylphenyl) ether.

V) Cycloaliphatic epoxy resins, such as, for example, bis (2,3-epoxycyclopentyl)ether, 2,3-epoxycyclopentyl glycidyl ether, 1,2-bis(2,3-epoxycyclopentyloxy)ethane or 3,4-epoxycyclohexylmethyl-3',4'-epoxycyclohexanecarboxylate.

It is also possible to use epoxy resins in which the 1,2-epoxy groups are bonded to different hetero atoms or functional groups; these compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Particularly preferred are those mentioned in I and II and most preferred are those mentioned in II.

Any trimerization catalyst known in the art may be used to prepare the above curable compositions.

Examples of suitable catalysts include (a) organic strong bases, (b) tertiary amine co-catalyst combinations, (c) Friedel Crafts catalysts, (d) basic salts of carboxylic acids, (e) alkali metal oxides, alkali metal alcoholates, alkali metal phenolates, alkali metal hydroxides and alkali metal carbonates, (f) onium compounds from nitrogen, phosphorus, arsenic, antimony, sulfur and selenium, and (g) monosubstituted monocarbamic esters and mixtures thereof. These include 1,3,5-tris(N,N-dialkylaminoalkyl)-s-hexahydro-triazines; the alkylene oxide and water or carboxylic acid adducts of 1,3,5-tris(N,N-dialkylaminoalkyl)-s-hexahydrotriazines; 2,4,6-tris(dimethylaminomethylphenol); ortho-, para- or a mixture of o- and p-dimethylaminomethylphenol and triethylenediamine or the alkylene oxide and water carboxylic acid adducts thereof, metal carboxylates such as lead octoate, sodium and potassium salts of octano hydroxamic acid, and organic boron containing compounds. Monofunctional alkanols containing from 1 to 24 carbon atoms, epoxides containing 2 to 18 carbon atoms and alkyl carbonates may be used in conjunction with tertiary amines to accelerate the rate of polymerisation reaction. The catalysts are present in a catalytically effective amount. Preferably, the concentration of trimerization catalysts that may be employed in the present invention is from 0.001-20 parts by weight and most preferably from 0.01-2 parts by weight of catalyst per 100 parts by weight of polyisocyanate.

Any polyol known in the polyurethane art may be used to prepare the curable composition.

The polyols may have an average molecular weight of 62-10,000 and an average nominal hydroxyl functionality of 2-8. They may be selected from ethylene glycol, diethylene glycol, propane diol, butane diol, pentane diol, hexane diol, glycerol, diethanolamine, triethanolamine, trimethylol propane, sorbitol, sucrose, polyether polyols, like polyoxyethylene polyols, polyoxypropylene polyols and polyoxyethylene polyoxypropylene polyols, polyester polyols and mixtures thereof.

The relative amounts of polyisocyanate, epoxy resin and polyol used in making the foam according to the present invention is such that the index is at least 10 and preferably at least 40 and most preferably at least 100.

Other ingredients which are often used in the polyurethane industry may be used in the present invention as well. Examples are surfactants, fire retardants, plasticizers, other catalysts like urethane catalysts, colorants and internal mould release agents.

They may be added to the curable composition directly or via one of its constituents but before the gas bubbles are deposited.

The process of preparing a crystalline arrangement of gas bubbles in the liquid, curable composition (which is the combining and mixing of the ingredients for the curable composition and the depositing and settling of the gas bubbles in this curable composition) should be terminated before the pot-life has passed (viscosity of the curable composition at 25° C. has reached 50,000 mPa·s). Preferably this process is conducted at ambient pressure and at a temperature between 0° C. and 100° C. and preferably 0° C. and 80° C. and within 10 seconds and 24 hours and preferably 1 minute and 10 hours.

Once the gas bubbles have settled themselves into a crystalline arrangement in the liquid, curable composition, this composition may be allowed to cure which is in the context of the present invention to form a plurality of one or more of the groups selected from urethane, isocyanurate and oxazolidone groups.

This curing may be conducted by simply allowing the mixture to further react without taking any further action. This way of curing may take days and even weeks and months. If one wishes to accelerate the curing and reduce the curing time, then a simple way of doing this is to increase the temperature. Temperatures up to 200° C. may be used.

Preferably the curing process is conducted at ambient pressure and a temperature of from 15° C. to 150° C.

The invention is illustrated with the following examples.

EXAMPLE 1

0.3 g of Tegostab B8465 (a surfactant obtainable from Goldschmidt), 2 g of Daltocel F526 (a polyol from Huntsman containing potassium lactate) and 10 g of Suprasec 2020 (a polyisocyanate from Huntsman) were hand-mixed under ambient conditions for half a minute and subsequently poured in an aluminium pan. The index was 1500. Air bubbles were blown into this mixture one at a time through a plastic syringe connected to a portable air pump (PG Dosing Unit) under ambient conditions for 5 minutes. The bubbles were subsequently allowed to arrange theirselves into close packing arrangement under ambient conditions for 1 minute. Subsequently the curable composition so obtained was allowed to cure for 30 minutes at 60° C. in order to allow for formation of a plurality of urethane and isocyanurate groups. The Dosing Unit was set such that the average diameter of the bubbles was about 1 mm.

A crystalline polyurethane polyisocyanurate mono-layer foam was obtained with more than 95% of the cells in close packing arrangement, the cells having an average diameter of about 1 mm.

EXAMPLE 2

Example 1 was repeated with the Dosing Unit set such that bubbles having an average diameter of about 2 mm were obtained.

A crystalline polyurethane polyisocyanurate monolayer foam was obtained with more than 95% of the cells in close packing arrangement, the cells having an average diameter of about 2 mm.

The invention claimed is:

1. Crystalline foam comprising a plurality of one or more of the groups selected from urethane, isocyanurate and oxazolidone groups and having a close packing of monodisperse or bidisperse cells or bubbles and wherein at least 50% of the cells or bubbles are in a cubic or hexagonal close packing arrangement.

2. The crystalline foam according to claim 1 wherein the cells have a diameter from 0.1 µm-1 cm.

* * * * *